US009464538B2

(12) United States Patent
Sezer et al.

(10) Patent No.: US 9,464,538 B2
(45) Date of Patent: Oct. 11, 2016

(54) SHROUD BLOCK SEGMENT FOR A GAS TURBINE

(71) Applicant: General Electric Company, Schenectady, NY (US)

(72) Inventors: Ibrahim Sezer, Greenville, SC (US); Anshuman Singh, Simpsonville, SC (US); Gary Michael Itzel, Simpsonville, SC (US); James William Vehr, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 615 days.

(21) Appl. No.: 13/936,583

(22) Filed: Jul. 8, 2013

(65) Prior Publication Data

US 2015/0007581 A1 Jan. 8, 2015

(51) Int. Cl.

*F02C 1/00* (2006.01)
*F01D 25/12* (2006.01)
*F01D 11/24* (2006.01)

(52) U.S. Cl.

CPC ............... *F01D 25/12* (2013.01); *F01D 11/24* (2013.01); *F05D 2240/11* (2013.01); *F05D 2250/191* (2013.01); *F05D 2260/201* (2013.01); *F05D 2260/205* (2013.01)

(58) Field of Classification Search

CPC .............. F01D 9/00; F01D 9/02; F01D 9/06; F01D 9/047; F01D 9/042; F01D 9/04; F01D 11/14; F01D 11/24

See application file for complete search history.

(56) References Cited

U.S. PATENT DOCUMENTS

| | | | | | |
|---|---|---|---|---|---|
| 5,375,973 | A | | 12/1994 | Sloop et al. | |
| 6,126,389 | A | * | 10/2000 | Burdgick | F01D 11/24 415/115 |
| 6,139,257 | A | * | 10/2000 | Proctor | F01D 9/04 415/115 |
| 6,196,792 | B1 | | 3/2001 | Lee et al. | |
| 6,554,566 | B1 | | 4/2003 | Nigmatulin | |
| 6,666,645 | B1 | * | 12/2003 | Arilla | F01D 11/24 415/116 |
| 6,887,033 | B1 | | 5/2005 | Phillips et al. | |
| 7,665,962 | B1 | * | 2/2010 | Liang | F01D 11/24 415/115 |
| 7,670,108 | B2 | | 3/2010 | Liang | |
| 8,128,344 | B2 | | 3/2012 | McGovern et al. | |
| 8,814,507 | B1 | * | 8/2014 | Campbell | F01D 5/08 415/139 |
| 2002/0098079 | A1 | * | 7/2002 | Fujikawa | F01D 9/00 415/116 |
| 2008/0131262 | A1 | * | 6/2008 | Lee | F01D 9/04 415/115 |
| 2008/0206042 | A1 | * | 8/2008 | Lee | F01D 5/143 415/116 |
| 2010/0284800 | A1 | | 11/2010 | Sewall et al. | |
| 2013/0028727 | A1 | * | 1/2013 | Shinoda | F01D 9/065 415/208.1 |
| 2014/0294560 | A1 | * | 10/2014 | Mishra | F01D 11/24 415/1 |

* cited by examiner

*Primary Examiner* — Gerald L Sung

(74) *Attorney, Agent, or Firm* — Dority & Manning, PA

(57) ABSTRACT

A shroud block segment for a gas turbine includes a main body having a leading portion, a trailing portion, a first side portion and an opposing second side portion that extend axially between the leading portion and the trailing portion. The main body further includes an arcuate combustion gas side, an opposing back side and a cooling chamber defined in the back side. A cooling plenum and an exhaust passage are defined within the main body where the exhaust passage provides for fluid communication out of the cooling plenum. An insert opening extends within the main body through the back side towards the cooling plenum. A cooling flow insert is disposed within the insert opening. The cooling flow insert comprises a plurality of cooling flow passages that provide for fluid communication between the cooling chamber and the cooling plenum.

19 Claims, 11 Drawing Sheets

SHROUD BLOCK SEGMENT FOR A GAS TURBINE

FIELD OF THE INVENTION

The present invention generally involves a gas turbine. More specifically, the invention relates to cooling of a shroud block segment within a turbine section of the gas turbine.

BACKGROUND OF THE INVENTION

A gas turbine generally includes a compressor, a combustor disposed downstream form the compressor and a turbine section disposed downstream from the combustor. A working fluid such as air enters the compressor where it is progressively compressed to provide a compressed working fluid to the combustor. Fuel is mixed with the compressed working fluid within the combustor and the mixture it is burned to produce combustion gases at a high temperature and a high velocity. The combustion gases are then routed from the combustor into the turbine section where thermal and/or kinetic energy are extracted to produce work.

The turbine section generally includes a plurality of rotor blades that extend radially from a rotor disk that is coupled to a rotor shaft. The rotor blades are circumferentially surrounded by a casing. Each rotor blade includes a blade tip that is defined at a distal or radial end of the rotor blade. A shroud assembly extends circumferentially within the casing around the plurality of rotor blades. The shroud assembly is typically mounted to an inner surface of the casing. The shroud assembly often comprises a number of shroud block segments that are arranged in an annular array around the tips of the rotor blades.

The plurality of rotor blades and the shroud block segments at least partially define a hot gas path for routing the hot combustion gases through the turbine section. A small radial gap is generally defined between the blade tips and a hot side portion of the shroud block segments. The radial gap is designed or sized to provide radial clearance between the blade tips and the hot side portion of the shroud block segments, while also providing a partial fluidic seal to control leakage of the combustion gases over the blade tips during operation. Leakage of the combustion gases over the blade tips generally results in a decrease in overall turbine efficiency.

The rotor blades and shroud block segments, particularly the hot side portions, are subjected to the high temperature combustion gases as they flow through the turbine section. As a result, cooling of the rotor blade tips and the shroud block segments is necessary to reduce thermal stresses and to improve durability of those components. One cooling scheme for cooling shroud block segments includes directing a cooling medium such as a portion of the compressed working fluid onto a backside portion of each shroud block segment. The cooling medium is routed from the back side portion into a cooling channel that is defined within the shroud block segment via a plurality of cooling passages. The cooling medium is then exhausted into the hot gas path via one or more exhaust passages defined the shroud block segments. The cooling channel is in thermal communication with the hot side portion, thereby allowing for heat transfer between the hot side portion and the cooling medium before the cooling medium is exhausted from the cooling channel.

The cooing passages are generally machined and/or cast into the shroud block segments. Once the cooling passages have been cast and/or machined into the shroud block segment the ability to later modify the size, pattern and quantity of the cooling passages thereby modifying or tuning the cooling provided to the shroud block segment becomes limited. Therefore, a system for cooling a shroud block segment which provides for cooling flow flexibility would be useful.

BRIEF DESCRIPTION OF THE INVENTION

Aspects and advantages of the invention are set forth below in the following description, or may be obvious from the description, or may be learned through practice of the invention.

One embodiment of the present invention is a shroud block segment for a gas turbine. The shroud block segment includes a main body having a leading portion, a trailing portion and a first side portion and an opposing second side portion that extend axially between the leading portion and the trailing portion. The main body further includes an arcuate combustion gas side, an opposing back side and a cooling chamber defined in the back side. A cooling plenum and an exhaust passage are defined within the main body where the exhaust passage provides for fluid communication out of the cooling plenum. An insert opening extends within the main body through the back side towards the cooling plenum. A cooling flow insert is disposed within the insert opening. The cooling flow insert comprises a plurality of cooling flow passages that provide for fluid communication between the cooling chamber and the cooling plenum.

Another embodiment of the present invention is a shroud block segment. The shroud block segment includes a main body having a leading portion, a trailing portion and a first side portion and an opposing second side portion that extend axially between the leading portion and the trailing portion. The main body further includes an arcuate combustion gas side, an opposing back side and a cooling chamber defined in the back side. A cooling plenum is defined within the main body. An exhaust passage is defined within the main body and provides for fluid communication out of the cooling plenum. An insert opening extends within the main body through the back side towards the cooling plenum. A cooling flow impingement plate extends across the insert opening and is connected to the back side. The impingement plate comprises a plurality of cooling flow passages that provide for fluid communication between the cooling chamber and the cooling plenum.

The present invention may also include a gas turbine. The gas turbine generally includes a compressor disposed at an upstream end of the gas turbine, a combustor disposed downstream from the compressor and a turbine section disposed downstream from the combustor. The turbine section includes a plurality of rotor blades that extend radially within a turbine casing and a shroud block assembly that extends circumferentially around the rotor blades within the casing. The shroud block assembly includes a plurality of shroud block segments that are arranged in an annular array around the rotor blades. Each shroud block segment comprises a main body having a leading portion, a trailing portion and a first side portion and an opposing second side portion that extend axially between the leading portion and the trailing portion. The shroud block segments also include an arcuate combustion gas side, an opposing back side and a cooling chamber defined in the back side. A cooling plenum is defined within the main body. An exhaust passage is defined within the main body and provides for fluid communication out of the cooling plenum. An insert opening extends within the main body through the back side towards the cooling plenum. At least one of a cooling flow insert is disposed within the insert opening or a cooling flow impingement plate extends across the insert opening. At least one of the cooling flow insert or the cooling flow impingement plate define a plurality of cooling flow passages that provide for fluid communication between the cooling chamber and the cooling plenum.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
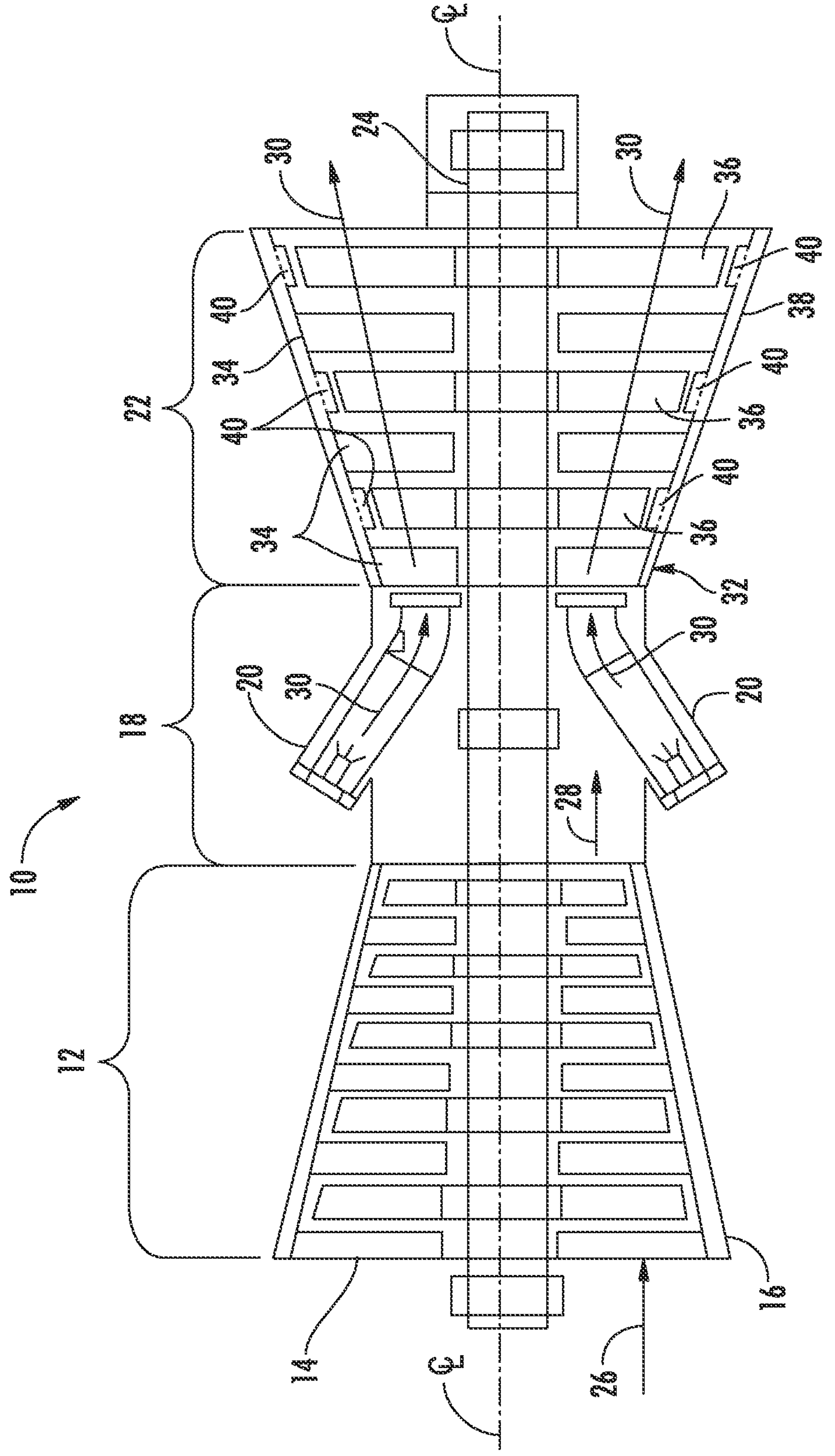
FIG. 1 provides an example of a gas turbine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components. The terms “upstream” and “downstream” refer to the relative direction with respect to fluid flow in a fluid pathway. For example, “upstream” refers to the direction from which the fluid flows, and “downstream” refers to the direction to which the fluid flows. The term “radially” refers to the relative direction that is substantially perpendicular to an axial centerline of a particular component, and the term “axially” refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine and is not limited to an industrial gas turbine unless specifically recited in the claims.

Referring now to the drawings, wherein like numerals refer to like components, FIG. 1 illustrates an example of a gas turbine 10 as may incorporate various embodiments of the present invention. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having a combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Figure 2:
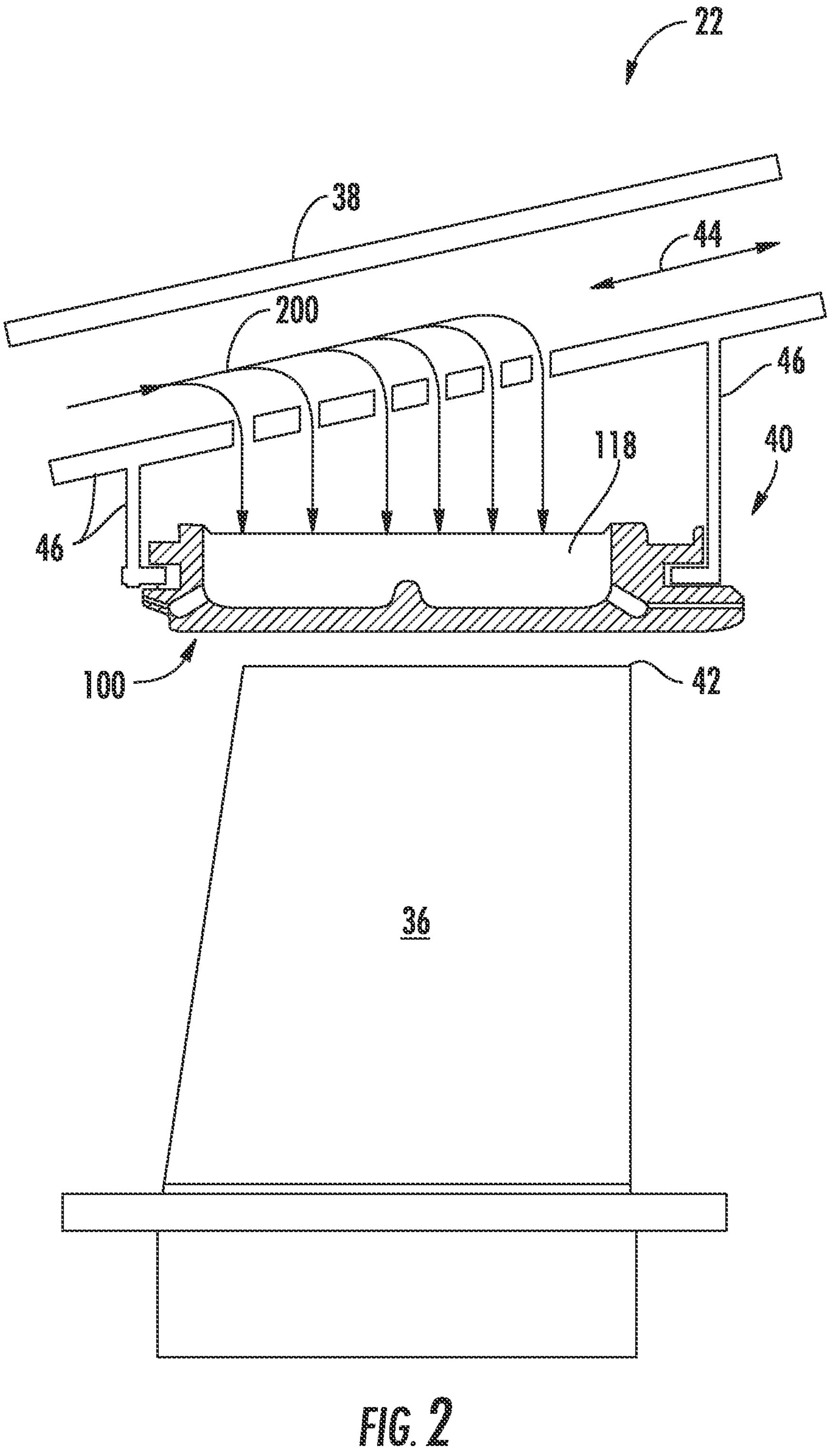
FIG. 2 provides an enlarged cross section side view of a portion of a turbine section of the gas turbine as shown in FIG. 1.

FIG. 2 provides an enlarged cross section side view of a portion of the turbine section 22 including an exemplary rotor blade 36 and a portion of the shroud block assembly 40 according to various embodiments of the present disclosure. As shown in FIG. 2, the shroud block assembly 40 generally extends radially between the turbine casing and a tip portion 42 of the rotor blade 36. The shroud block assembly 40 is in fluid communication with a cooling flow path 44. The cooling flow path 44 may be at least partially defined by the outer casing 38. The shroud block assembly 40 generally includes mounting hardware 46 for securing the shroud block assembly 40 to the turbine casing 38 and/or for supporting a plurality of shroud block segments 100 that are arranged in an annular array around the rotor blades 36 within the turbine casing 38.

Figure 3:
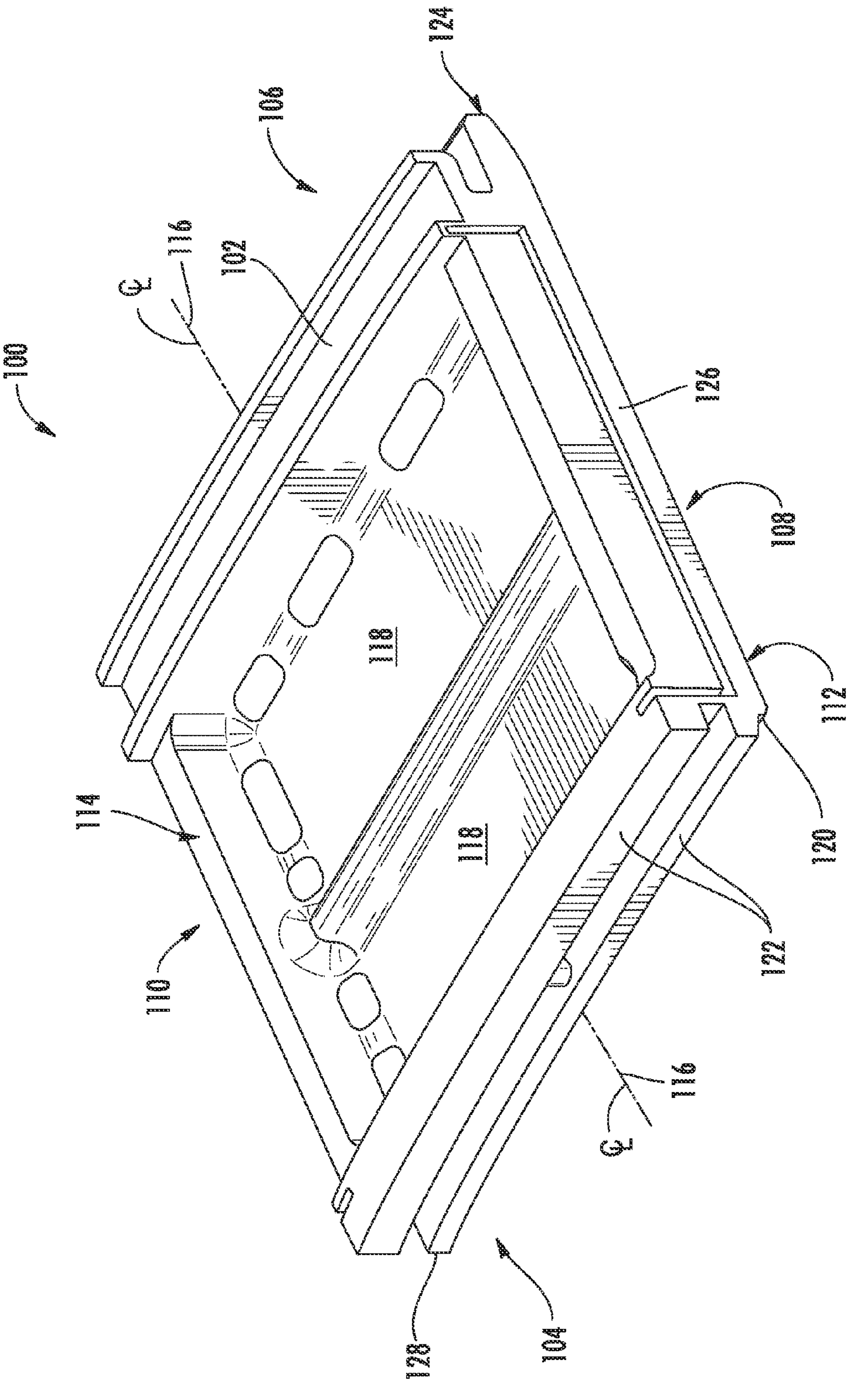
FIG. 3 provides a perspective view of an exemplary shroud block segment as may incorporate various embodiments of the present invention.

FIG. 3 provides a perspective view of the shroud block segment 100 as shown in FIG. 2, according to various embodiments. As shown in FIG. 3, the shroud block segment 100 includes a main body 102 having a leading portion 104, a trailing portion 106, a first side portion 108 and an opposing second side portion 110. The first and the second side portions 108, 110 extend axially between the leading portion 104 and the trailing portion 106. The main body 102 further includes a combustion gas side 112 that is radially separated from an opposing back side 114. The combustion gas side 112 has a generally arcuate or circumferential shape with respect to an axial centerline 116 of the shroud block segment 100. The combustion gas side 112 may be coated with a heat resistant coating such as a thermal barrier coating or the like. A cooling pocket or chamber 118 is defined in the back side 114. The cooling chamber 118 is at least partially defined between the leading portion 104, the trailing portion 106, the first side portion 108 and the opposing second side portion 110.

The leading portion 104 at least partially defines a leading edge 120 and/or a forward face 122. The leading edge 120 and/or the forward face 122 extend transversely across the leading portion 104 between the first and second side portions 104, 106. The trailing portion 106 at least partially defines a trialing edge 124 that extends transversely across the trailing portion 106 between the first and second side portions 108, 110. The first side portion 108 at least partially defines a first mating face 126 and the second side portion 110 at least partially defines a second mating face 128. The first and second mating faces 126, 128 extend axially between the leading portion 104 and the trailing portion 106.

Figure 4:
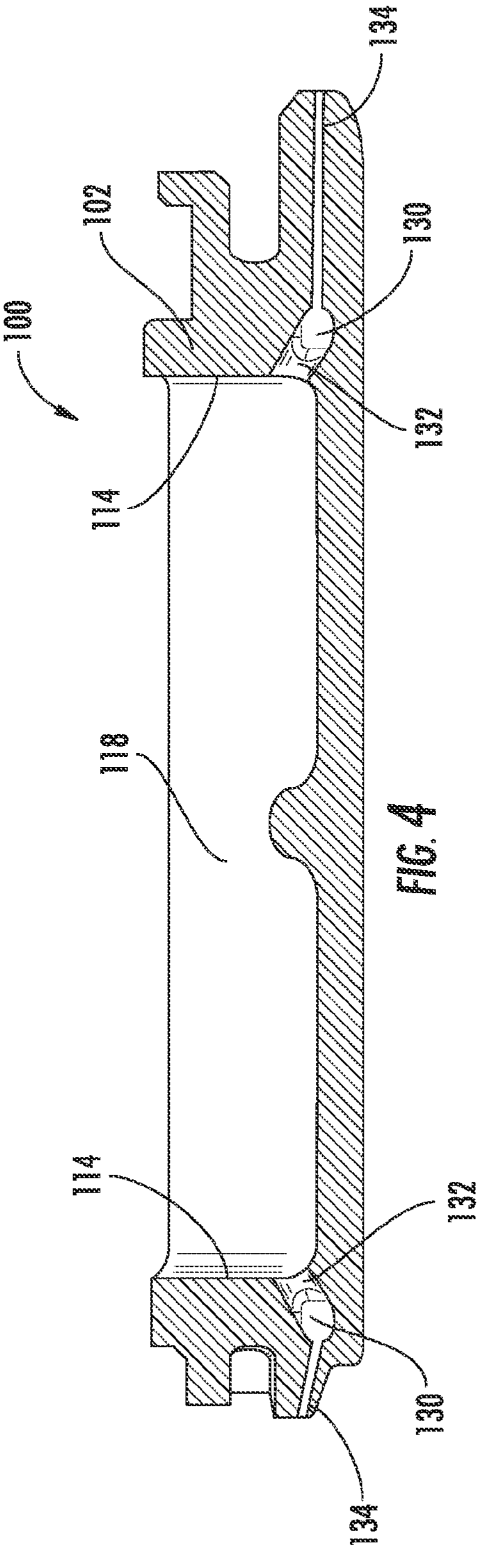
FIG. 4 provides an enlarged cross section side view of the shroud block segment as shown in FIG. 3, according to one embodiment of the present invention.
Figure 5:
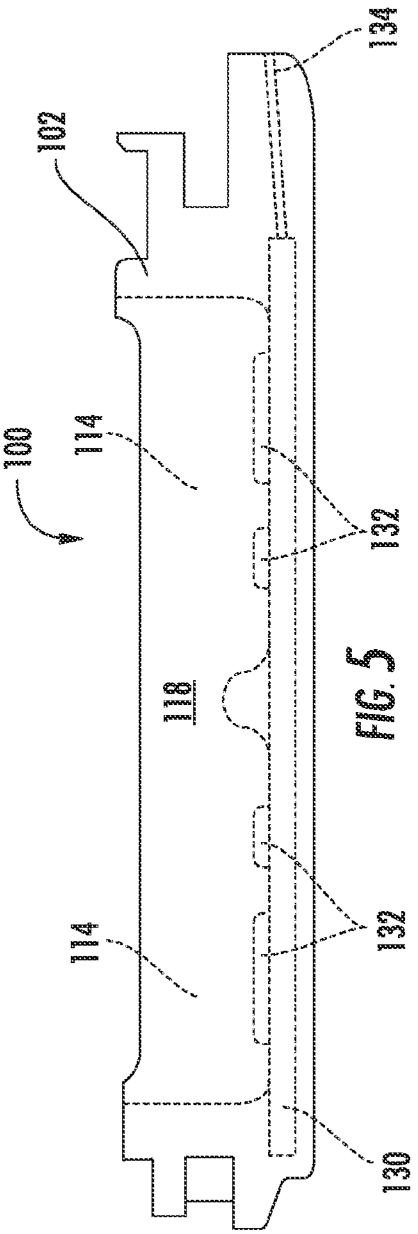
FIG. 5 provides a side view of the shroud block segment as shown in FIG. 4, according to one embodiment of the present invention.

FIG. 4 provides a cross section side view of the shroud block segment 100 as shown in FIG. 3, according to various embodiments of the present invention, and FIG. 5 provides a cross section side view of the shroud block segment 100 as shown in FIG. 3, according to various embodiments of the present invention. In particular embodiments, as shown in FIGS. 4 and 5, at least one cooling plenum 130 is defined within the main body 102. An insert opening 132 extends within the main body 102 through the back side 114 and into the cooling plenum 130. The insert opening 132 is generally disposed within the cooling chamber 118. As shown in FIGS. 4 and 5, at least one exhaust passage 134 is defined within the main body 102. The exhaust passage provides for fluid communication out of the cooling plenum 130. The cooling plenum 130, the insert opening 132 and/or the exhaust passage 134 may be cast into the main body 102 and/or may be machined into the main body 102. In particular embodiments, the shroud block segment 100 may include a plurality of cooling plenums 130, a plurality of insert openings 132 and/or a plurality of exhaust passages 134.

Figure 6:
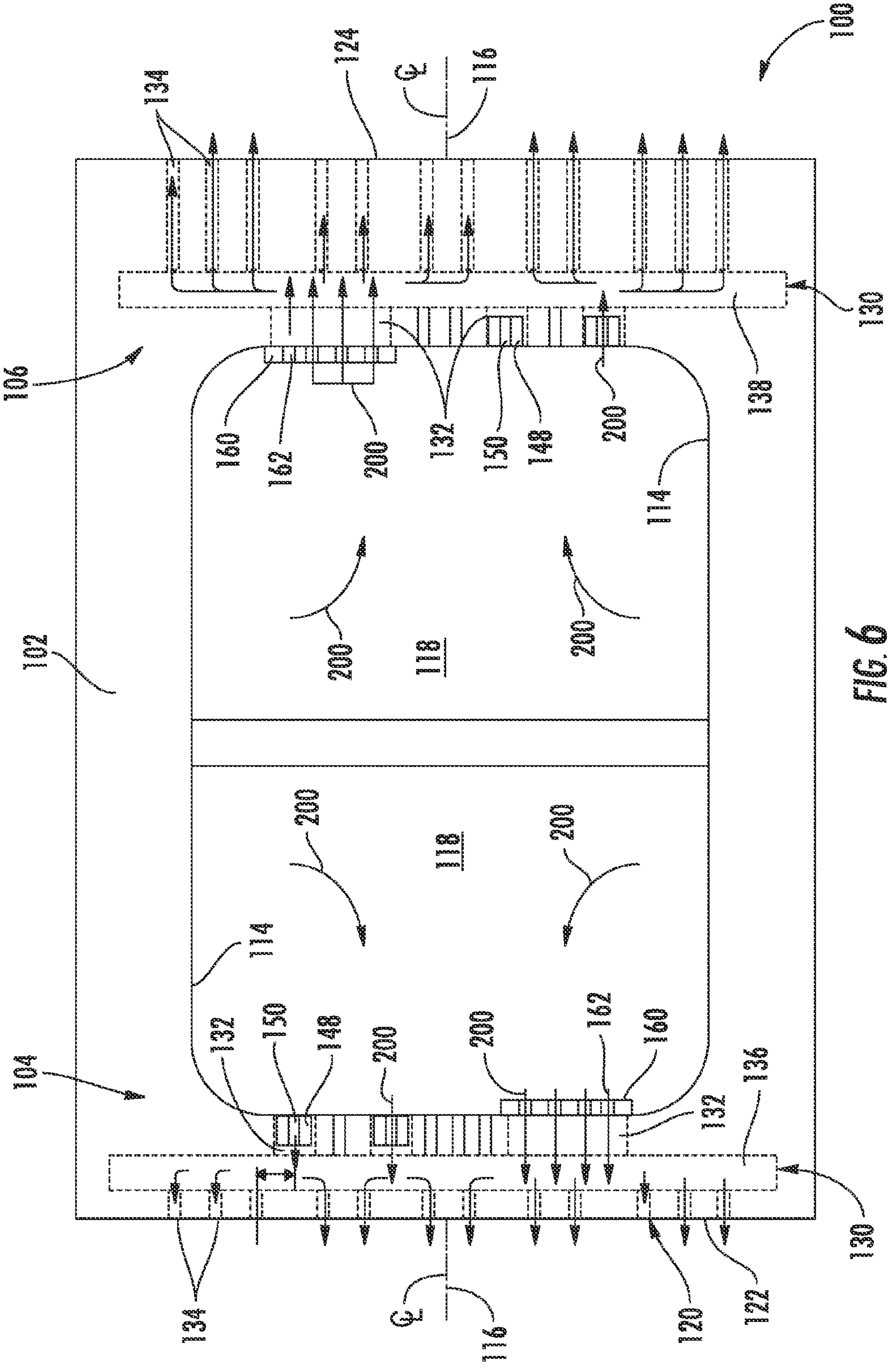
FIG. 6 provides a partial cross section top view of the shroud block segment as shown in FIG. 3, according to various embodiments of the present invention.
Figure 7:
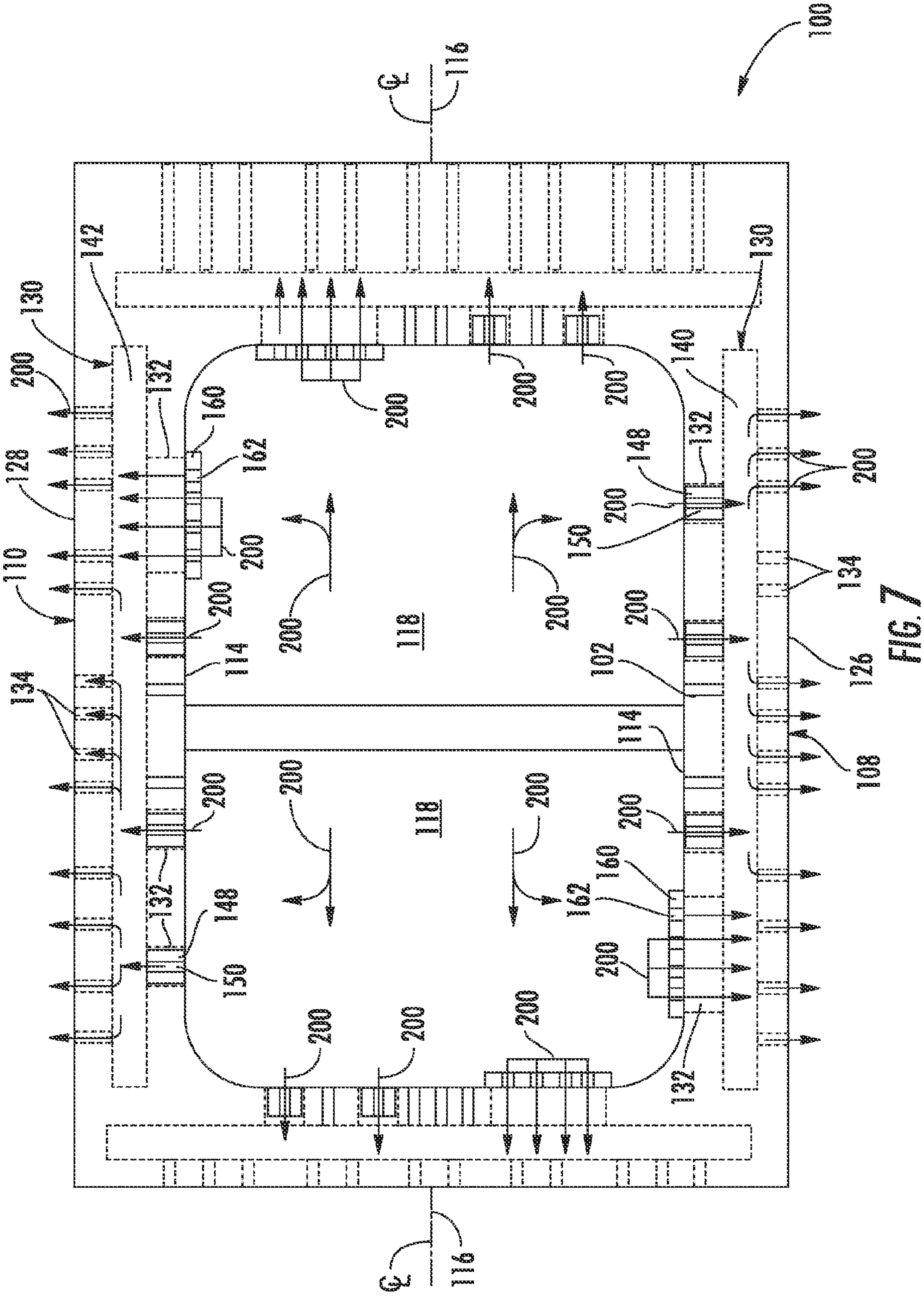
FIG. 7 provides a partial cross section top view of the shroud block segment as shown in FIG. 3, according to various embodiments of the present invention.
Figure 8:
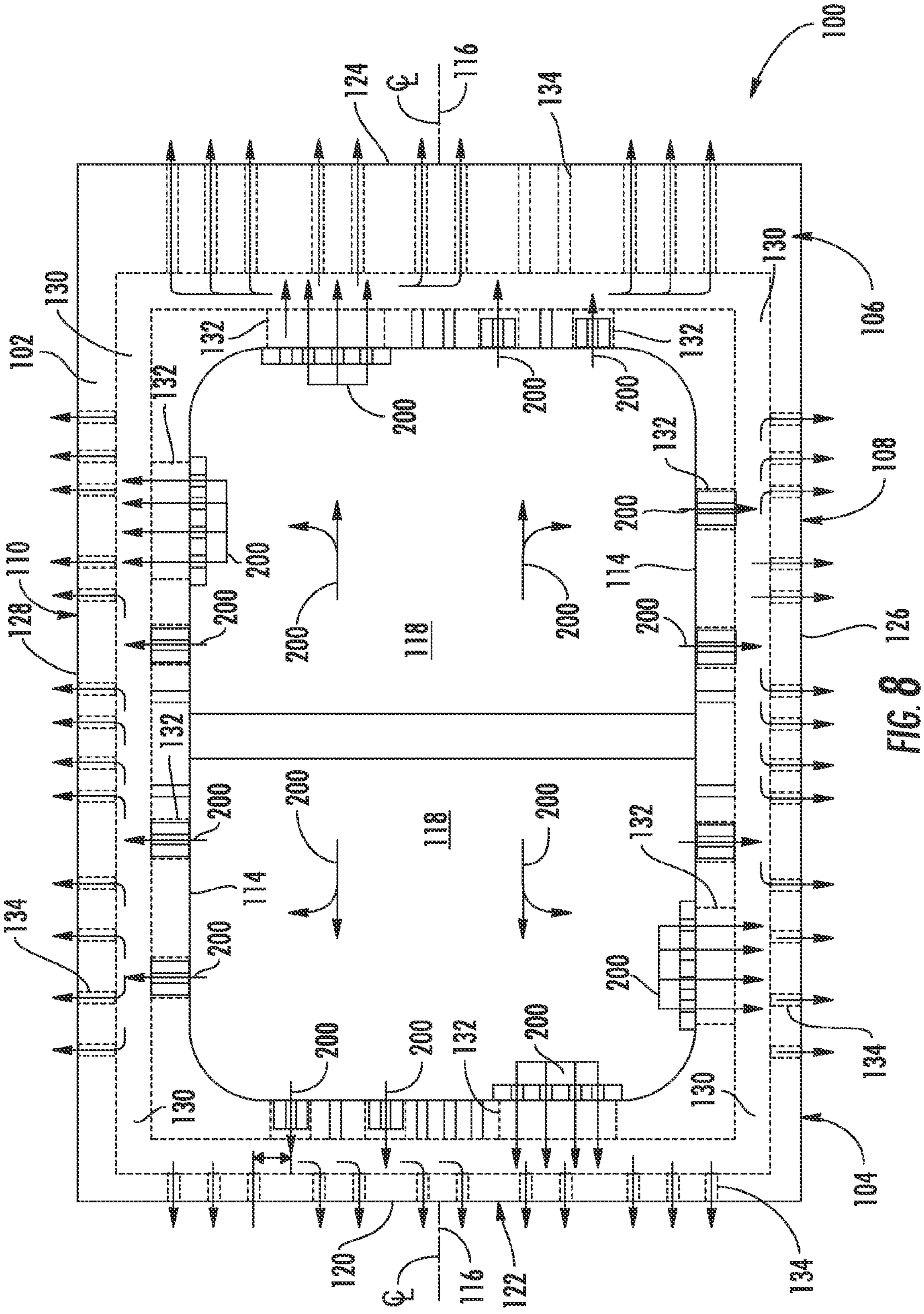
FIG. 8 provides a partial cross section top view of the shroud block segment as shown in FIG. 3, according to various embodiments of the present invention.

FIGS. 6, 7 and 8 provide partial cross sectional top views of the shroud block segment 100 as shown in FIG. 3, according to various embodiments of the present invention. In one embodiment, as shown in FIG. 6, a the cooling plenum 130 comprises a forward cooling plenum 136 that extends transversely with respect to centerline 116 across the main body 102 along the leading portion 104 proximate to the leading edge 120 and/or the forward face 122. One or more exhaust passages 134 extend through at least one of the leading edge 120 and/or the forward face 122. One or more insert openings 132 extend through the backside 114 and into the forward cooling plenum 136.

In particular embodiments, as shown in FIG. 6, the cooling plenum 130 comprises an aft cooling plenum 138 that extends transversely with respect to centerline 116 across the main body 102 proximate to the trailing portion 106 and/or the trailing edge 124. One or more exhaust passages 134 extend through the trailing portion 106 and/or the trialing edge 124. One or more insert openings 132 extend through the backside 114 and into the aft cooling plenum 138.

In particular embodiments, as shown in FIG. 7, the cooling plenum 130 comprises a first side cooling plenum 140 that extends axially within the main body 102 with respect to the centerline 116 proximate to the first side portion 108. One or more exhaust passages 134 extend through the first mating face 126. One or more insert openings 132 extend through the backside 114 and into the first side cooling plenum 140. In addition or in the alternative, the cooling plenum 130 may comprise a second side cooling plenum 142 that extends axially within the main body 102 with respect to the centerline 116 proximate to the second side portion 110. One or more exhaust passages 134 extend through the second mating face 128. One or more insert openings 132 extend through the backside 114 and into the second side cooling plenum 142.

In one embodiment, as shown in FIG. 8, the cooling plenum 130 may extend within the main body 102 continuously. For example, the cooling plenum 130 may extend transversely across the leading portion 104 and the trialing portion 106 and extend axially therebetween along both the first side portion 108 and the second side portion 110. One or more insert openings 132 extend through the backside 114 and into cooling plenum 130. Exhaust passages 134 extend through each or some of the leading edge 120, the forward face 122, the first mating face 126, the second mating face 128, the trailing portion 106 and/or the trialing edge 124.

Figure 9:
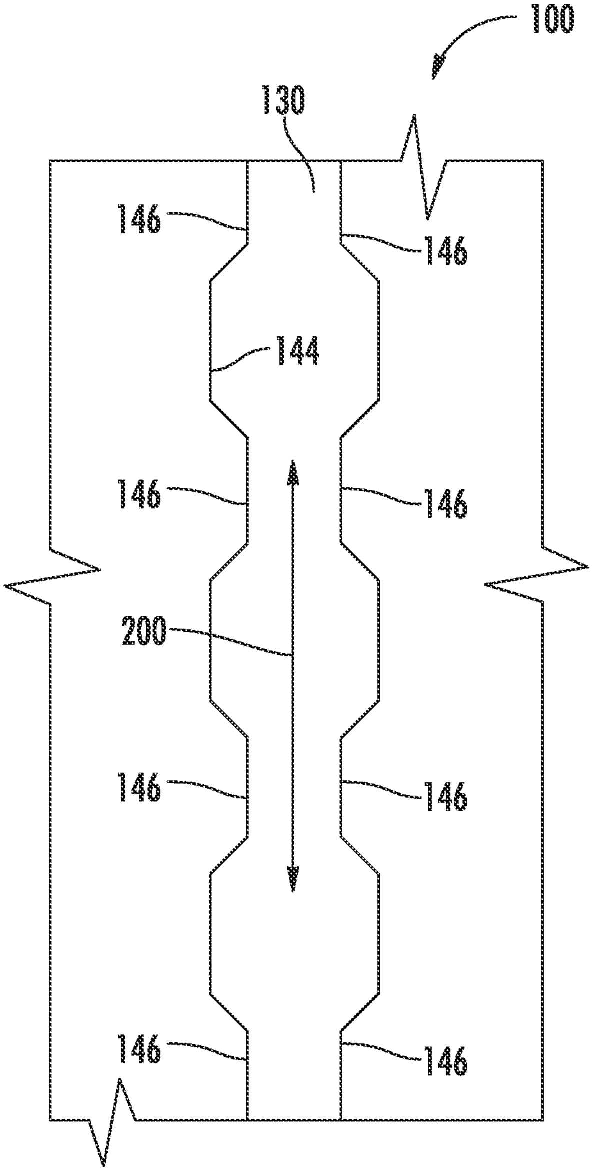
FIG. 9 provides an enlarged cross section of a portion of the shroud block segment as shown in FIG. 3, according to one embodiment of the present invention.

FIG. 9 provides a cross section top view of a portion of the shroud block segment 100 including a portion of the cooling plenum 130 which may be representative of each or some of the forward cooling plenum 136, the aft cooling plenum 138 and/or the first and second side cooling plenums 140, 142 according to one embodiment. As shown in FIG. 9, the cooling plenum 130 may include a profiled inner surface 144 including a ridge 146 or other surface feature that is operative to affect a flow of a pressurized cooling medium that flows within the cooling plenum 130. The profiled inner surface 144 may be included as a feature of any of the forward cooling plenum 136, the aft cooling plenum 138 and/or the first and second side cooling plenums 140, 142 as described above. The ridges 146 may decrease an inner diameter of the cooling plenum 130. The ridges 146 may be formed using a machining tool such as an EDM probe that is inserted into the cooling plenum 130. In the alternative, the ridges 146 may be cast into the cooling plenum 130.

Figure 10:
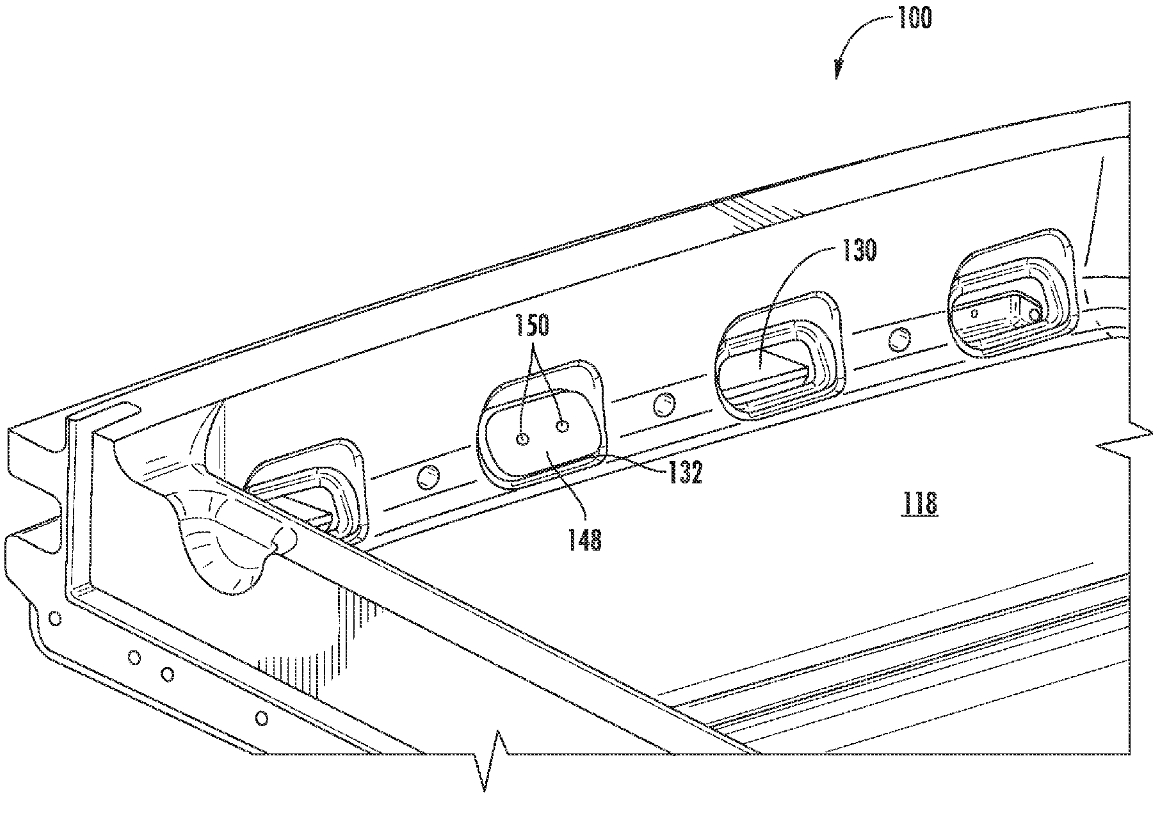
FIG. 10 provides a partial perspective view of a portion of the shroud block segment as shown in FIG. 3, according to one embodiment of the present invention.

FIG. 10 provides a partial perspective view of the cooling block segment 100 as shown in FIG. 3, according to one embodiment of the present invention. As shown in FIG. 10, a cooling flow insert 148 is disposed within a corresponding insert opening 132. In particular embodiments, as shown in FIGS. 6, 7 and 9 a plurality of cooling flow inserts 148 is disposed in each or some of the insert openings 132.

Figure 11:
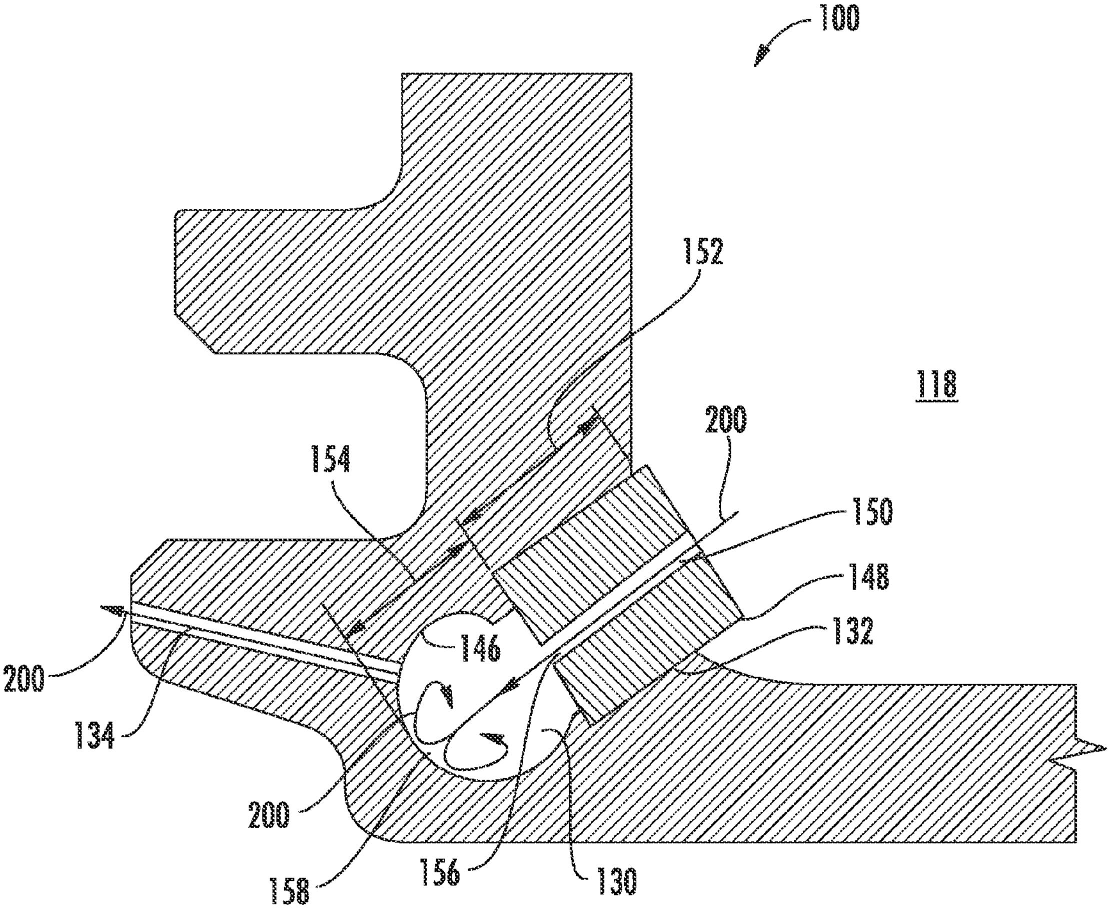
FIG. 11 provides a cross section side view of a portion of the shroud block segment as shown in FIG. 3, according to at least one embodiment of the present invention.

FIG. 11 provides an enlarged cross section side view of a portion of the cooling block segment 100 as shown in FIG. 10, according to one embodiment. As shown in FIGS. 10 and 11, one or more cooling flow passages 150 provide for fluid communication between the cooling chamber 118 and the cooling plenum 130. As shown in FIG. 11, the cooling flow insert 148 may extend a depth 152 into the insert opening 132 so as to define a distance 154 between an outlet 156 of the cooling flow passage 150 and an impingement portion or contact area 158 of the cooling plenum 130. As shown in FIG. 6, at least some of the cooling passages 150 are offset with respect to the exhaust passages 134 so as to increase convective cooling within the cooling plenum 130 by reducing secondary flow.

Figure 13:
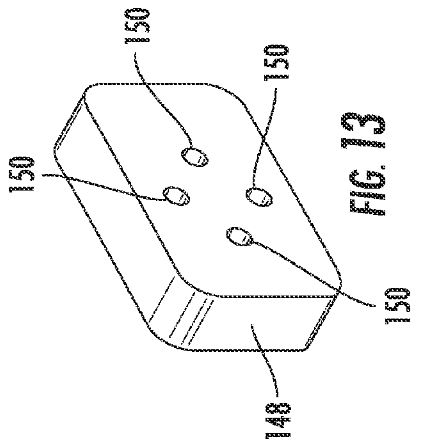
FIG. 13 provides a perspective view of a cooling flow insert according to one embodiment of the present invention.
Figure 12:
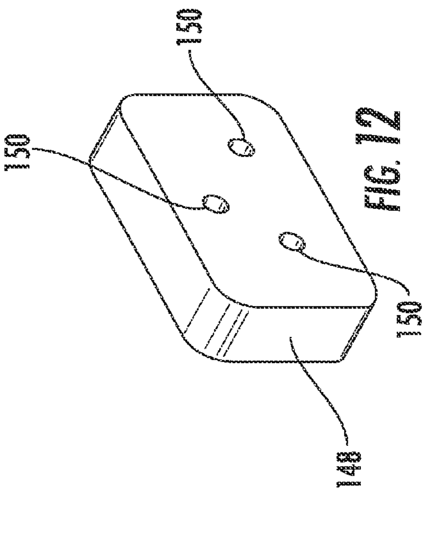
FIG. 12 provides a perspective view of a cooling flow insert according to one embodiment of the present invention.

FIGS. 12, 13 provide perspective views of exemplary cooling flow inserts 148 according to various embodiments of the present invention. The cooling flow passages 150 may be arranged in any pattern and in any quantity from one to a plurality within the cooling flow insert. For example, as shown in FIG. 12 the cooling flow passages may be arranged in a triangular array. In the alternative, as shown in FIG. 13, the cooling flow passages 150 may be arranged in a substantially circular pattern within the cooling flow insert 148. Although the cooling flow passages 150 are generally illustrated as having a circular cross section, the cooling flow passages 150 may have any cross sectional shape and any diameter, constant or variable, so as to provide effective cooling within the cooling plenum 130 at a particular impingement portion or contact area 158 (FIG. 11).

Figure 14:
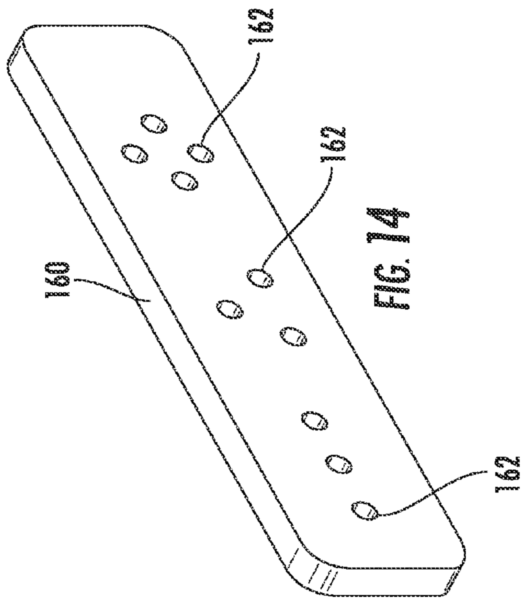
FIG. 14 provides a perspective view of a cooling flow impingement plate according to at least one embodiment of the present invention.

In one embodiment, as shown in FIG. 6, an impingement plate 160 extends across a corresponding insert opening 132. The impingement plate 160 may be connected to the back side 114. The impingement plate 160 comprises a plurality of cooling flow passages 162 that provide for fluid communication between the cooling chamber 118 and the cooling plenum 130. FIG. 14 provides a perspective view of an exemplary impingement plate 160 according to various embodiments of the present invention. As shown, the cooling flow passages 162 may be arranged in any pattern and in any quantity from one to a plurality within the impingement plate 160. For example, as shown in FIG. 14 the cooling flow passages may be arranged in at least one of a horizontal, a triangular or a circular array. The cooling passages 162 may be offset with respect to the exhaust passages 134. As shown in FIGS. 6, 7 and 8, at least some of the cooling passages 162 are offset with respect to the exhaust passages 134 so as to increase convective cooling within the cooling plenum 130. Although the cooling flow passages 162 are generally illustrated as having a circular cross section, the cooling flow passages 162 may have any cross sectional shape and any diameter, constant or variable, so as to provide effective cooling within the cooling plenum 130 at a particular impingement portion or contact area 158 (FIG. 11).

In operation, as shown in the various Figs., a cooling medium 200 such as a portion of the compressed working fluid is routed from the cooling flow passage 44 into the cooling chamber 118 of the shroud block segment 100. The cooling medium 200 is then routed from the cooling chamber through the cooling flow passages 150 and/or 162 where the velocity of the cooling medium 200 is increased. The cooling medium 200 is then impinged against the inner surface 144 and/or the ridges 146 of the cooling plenum 130 at a particular impingement portion or contact area 158 within the cooling plenum 130. The cooling medium 200 is directed within the cooling plenum 130 towards the exhaust passages 134, thereby providing convective cooling to a portion of the cooling plenum 130. The offset exhaust passages 134 increase the exposure time of the cooling medium 200 to the inner surfaces 144 and/or the ridges 146 of the cooling plenum, thereby increasing the cooling efficiency of the cooling medium 200. In particular embodiments, the ridges 146 defined within the cooling plenum 130 may improve the convective cooling efficiency of the cooling medium 200 by disrupting the flow of the cooling medium 200. A desirable effect of the ridges 146 may also include creating vortices in the flow of the cooling medium 200 that increases the convective cooling effects of the cooling medium 200.

The various embodiments as described herein and as presented in FIGS. 2 through 14 provide various technical benefits over existing cooling schemes for providing directed cooling to various locations within the shroud block segment 100. For example, the depth 152 at which the cooling flow insert 148 is seated into the insert opening 132 may be modified post production of the shroud block segment 100, thereby allowing for greater flexibility in the design and usability of the particular shroud block segment 100. In addition, the pattern and/or quantity of the cooling passages 150, 162 may be easily changed to modify cooling of the shroud block segment 100 by replacing the cooling flow insert 150 and/or the impingement plate 160, without having to scrap the shroud block segment 100, thereby saving costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A shroud block segment: comprising:

a. a main body having a leading portion, a trailing portion, a first side portion and an opposing second side portion that extend axially between the leading portion and the trailing portion, an arcuate combustion gas side, an opposing back side and a cooling chamber defined in the back side;

b. a cooling plenum defined within the main body;

c. an exhaust passage defined within the main body, wherein the exhaust passage provides for fluid communication out of the cooling plenum;

d. an insert opening defined within a wall of the main body along the back side, wherein the insert opening extends through the wall and towards the cooling plenum; and e. a cooling flow insert disposed within the insert opening, wherein the cooling flow insert comprises a forward portion, at least the forward portion extending within the insert opening, wherein the cooling flow insert comprises a plurality of cooling flow passages that provide for fluid communication between the cooling chamber and the cooling plenum.

2. The shroud block segment as in claim 1, wherein at least one of the plurality of the cooling flow passages is offset with respect to the exhaust passage.

3. The shroud block segment as in claim 1, wherein the cooling passages are arranged in one of a horizontal, triangular or circular pattern within the cooling flow insert.

4. The shroud block segment as in claim 1, wherein the cooling plenum has an inner surface including a ridge that is operative to affect a flow of a pressurized cooling medium that flows within the cooling plenum.

5. The shroud block segment as in claim 1, wherein the leading portion at least partially defines a leading edge and a forward face, the trailing portion at least partially defines a trialing edge, the first side portion at least partially defines a first mating face and the second side portion at least partially defines a second mating face.

6. The shroud block segment as in claim 5, wherein the cooling plenum comprises a forward cooling plenum that extends transversely within the main body proximate to the leading edge and the exhaust passage extend through at least one of the leading edge or the leading face.

7. The shroud block segment as in claim 5, wherein the cooling plenum comprises an aft cooling plenum that extends transversely within the main body proximate to the trailing portion and the exhaust passage extend through the trailing edge.

8. The shroud block segment as in claim 5, wherein the cooling plenum comprises a first side cooling plenum that extends axially within the main body proximate to the first side portion and the exhaust passage extend through the first mating face.

9. The shroud block segment as in claim 5, wherein the cooling plenum comprises a second side cooling plenum. that extends axially within the main body proximate to the second side portion and the exhaust passage extend through the second mating face.

10. A shroud block segment, comprising:

a. a main body having a leading portion, a trailing portion, a first side portion and an opposing second side portion that extend axially between the leading portion and the trailing portion, an arcuate combustion gas side, an opposing back side and a cooling chamber defined in the back side;

b. a cooling plenum defined within the main body;

c. an exhaust passage defined within the main body, wherein the exhaust passage provides for fluid communication out of the cooling plenum;

d. an insert opening that extends within the main body through the back side towards the cooling plenum;

e. a cooling flow impingement plate that extends across the insert opening and is connected to the back side, wherein the impingement plate comprises a plurality of cooling flow passages that provide for fluid communication between the cooling chamber and the cooling plenum, wherein the cooling passages are arranged in one of a triangular or circular pattern within the cooling flow impingement plate; and f. a cooling flow insert disposed within the insert opening.

11. The shroud block segment as in claim 10, wherein at least one of the cooling passages are offset with respect to the exhaust passage.

12. The shroud block segment as in claim 10, wherein the cooling plenum has an inner surface including a ridge that is operative to affect a flow of a pressurized cooling medium that flows within the cooling plenum.

13. The shroud block segment as in claim 10, wherein the leading portion at least partially defines a leading edge and a forward face, the trailing portion at least partially defines a trialing edge, the first side portion at least partially defines a first mating face and the second side portion at least partially defines a second mating face.

14. The shroud block segment as in claim 10, wherein the cooling plenum comprises a forward cooling plenum that extends transversely within the main body proximate to the leading edge and the exhaust passage extend through at least one of the leading edge or the leading face.

15. The shroud block segment as in claim 14, wherein the cooling plenum comprises an aft cooling plenum. that extends transversely within the main body proximate to the trailing portion and the exhaust passage extend through the trailing edge.

16. The shroud block segment as in claim 14, wherein the cooling plenum comprises a first side cooling plenum that extends axially within the main body proximate to the first side portion and the exhaust passage extend through the first mating face.

17. The shroud block segment as in claim 14, wherein the cooling plenum comprises as second side cooling plenum that extends axially within the main body proximate to the second side portion and the exhaust passage extend through the second mating face.

18. A gas turbine, comprising:

a. a compressor disposed at an upstream end of the gas turbine;

b. a combustor disposed downstream from the combustor; and c. a turbine section disposed downstream from the combustor, the turbine section having a plurality of rotor blades that extend radially within a turbine casing and a shroud block assembly that extends circumferentially around the rotor blades within the casing, the shroud block assembly having a plurality of shroud block segments arranged in an annular array around the rotor blades, each shroud block segment comprising:

i. a main body having a leading portion, a trailing portion, a first side portion and an opposing second side portion that extend axially between the leading portion and the trailing portion, an arcuate combustion gas side, an opposing back side and a cooling chamber defined in the back side;

ii. a cooling plenum defined within the main body;

iii. an exhaust passage defined within the main body, wherein the exhaust passage provides for fluid communication out of the cooling plenum;

iv. an insert opening that extends within the main body through the back side towards the cooling plenum; and v. a cooling flow insert disposed within the insert opening and a cooling flow impingement plate that extends across the insert opening, wherein at least one of the cooling flow insert and the cooling flow impingement plate at least partially define a plurality of cooling flow passages that provide for fluid communication between the cooling chamber and the cooling plenum, wherein the cooling passages are arranged in one of a triangular or circular pattern within the cooling flow impingement plate.

19. The gas turbine as in claim 18, wherein;

a. the leading portion of the shroud block segment at least partially defines a leading edge, the trailing portion at least partially defines a trialing edge, the first side portion at least partially defines a first mating face and the second side portion at least partially defines a second mating face; and b. the cooling plenum extends within the main body generally proximate to at least one of the leading edge, the trailing edge, the first mating face or the second mating face.

* * * * *